United States Patent
Archer et al.

(10) Patent No.: US 9,110,803 B2
(45) Date of Patent: Aug. 18, 2015

(54) SOLVABLE EXCEPTIONS

(71) Applicant: Verizon Patent and Licensing Inc., Arlington, VA (US)

(72) Inventors: Don G. Archer, Euless, TX (US); Matt R. Bruce, Frisco, TX (US); William D. York, Fort Worth, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 132 days.

(21) Appl. No.: 13/655,703

(22) Filed: Oct. 19, 2012

(65) Prior Publication Data

US 2014/0115385 A1    Apr. 24, 2014

(51) Int. Cl.
*G06F 11/07* (2006.01)

(52) U.S. Cl.
CPC ........ *G06F 11/0793* (2013.01); *G06F 11/0736* (2013.01)

(58) Field of Classification Search
CPC ............ G06F 11/3466; G06F 11/3612; G06F 11/3423; G06F 11/348
USPC ............................................................ 714/57
See application file for complete search history.

(56) References Cited

U.S. PATENT DOCUMENTS

| | | | |
|---|---|---|---|
| 2008/0052149 A1* | 2/2008 | Fischer et al. | 705/10 |
| 2008/0295078 A1* | 11/2008 | Stall et al. | 717/125 |
| 2010/0082151 A1* | 4/2010 | Young et al. | 700/226 |
| 2012/0089859 A1* | 4/2012 | Wang et al. | 714/1 |

* cited by examiner

*Primary Examiner* — Jigar Patel

(57) ABSTRACT

A task unit included in an application is executed. The task unit includes instructions for executing an application task. An exception is thrown by the task unit. A program fragment for resolving the exception is identified and used to obtain user input to resolve the exception.

20 Claims, 3 Drawing Sheets

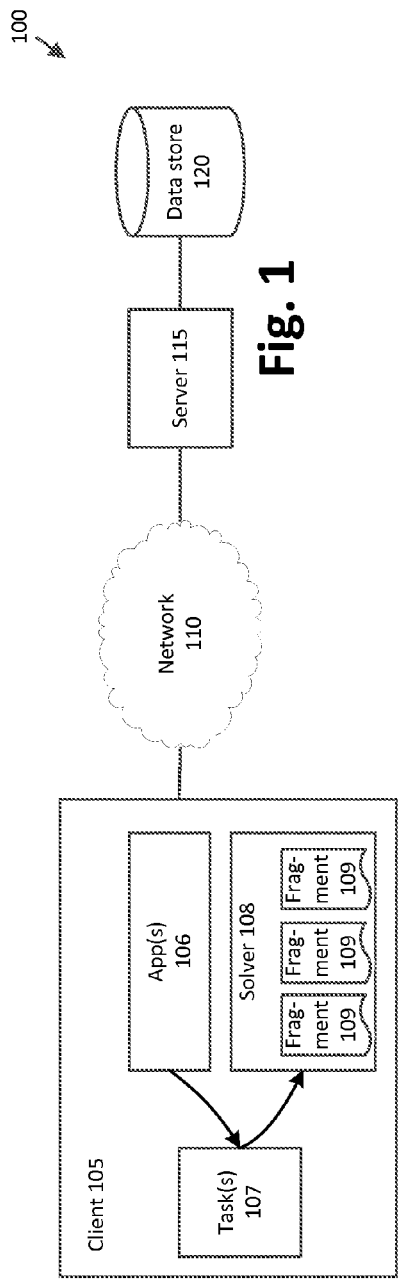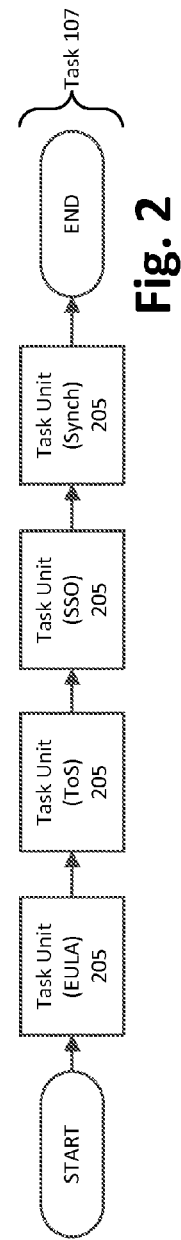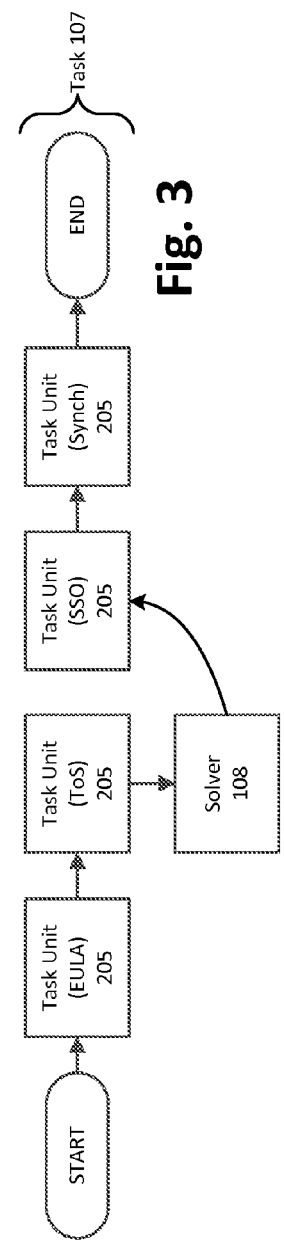

SOLVABLE EXCEPTIONS

BACKGROUND INFORMATION

Computer applications often raise exceptions, or otherwise halt execution, for a variety of reasons, including a failure to receive expected or needed input. Unfortunately, when expected input is not received, applications often lack mechanisms for addressing an exception condition. For example, an application may be lacking user information needed to proceed, but mechanisms for obtaining such information may be lacking.

BRIEF DESCRIPTION OF THE DRAWINGS

FIG. 1 illustrates an exemplary system for handling solvable exceptions.

FIG. 2 is a block diagram of an exemplary task that may be required by an application.

FIG. 3 is a block diagram of the exemplary task of FIG. 2 accessing a solver.

DETAILED DESCRIPTION OF PREFERRED EMBODIMENTS

Figure 4:
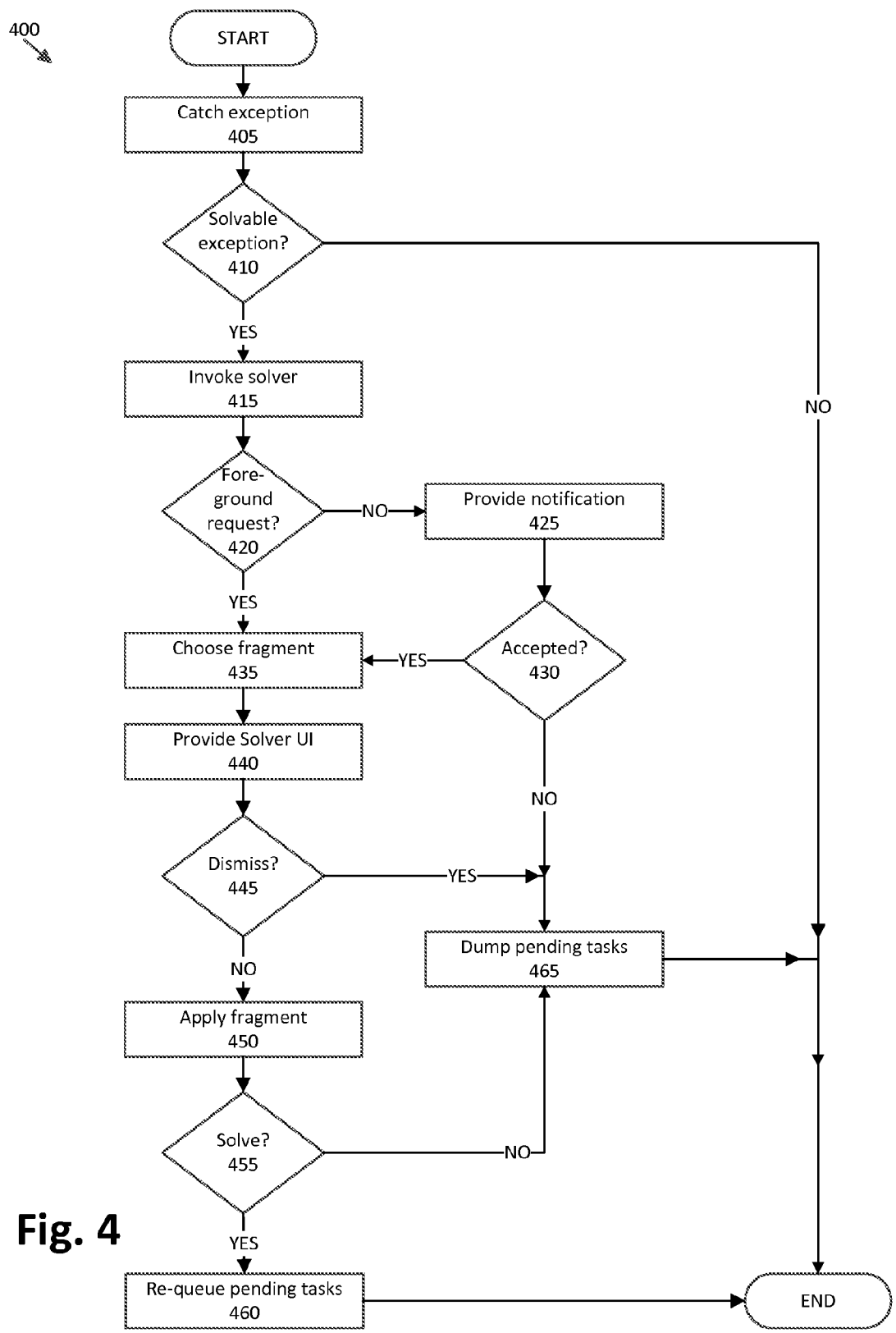
FIG. 4 is a flow diagram of an exemplary process for invoking and using a solver.

FIG. 1 illustrates an exemplary system 100 for handling solvable exceptions. The system 100 includes a client 105, the client 105 in turn including one or more applications 106. The applications 106 may in turn include and/or rely on one or more tasks 107, which in turn may call a solver 108. The solver 108 includes program fragments 109. When a task 107 encounters an exception, the solver 108 may be used to obtain inputs to resolve the exception, so that the task 107, and the application 106 that called or includes the task 107, may continue processing. A client 105 may communicate, e.g., via a network 110, with a server 115 and/or a data store 120.

A client 105 may be any one of a variety of computing devices, such as a desktop computer, laptop computer, tablet computer, smart phone, personal digital assistant, etc. In general, a client 105 includes a memory and a processor, the memory storing instructions executable by the processor, e.g., instructions such as may be included in an application 106 or the solver 107, as well as instructions included in an operating system or other code running on the client 105.

Applications 106, as just mentioned, generally include instructions stored in the memory of client 105 and executable by a processor. Applications 106 may include or may call on tasks 107. In general, a task 107 is a high-level operation of an application 106. As shown in FIGS. 2 and 3, discussed in more detail below, a task 107 generally includes one or more tasks units 205. Each task unit 205 may be a set of instructions stored in a memory, and executable by a processor, of the client 105. Examples of tasks 107 include processing a payment, synchronizing data, providing access to information, e.g., a webpage, etc.

Figure 5:
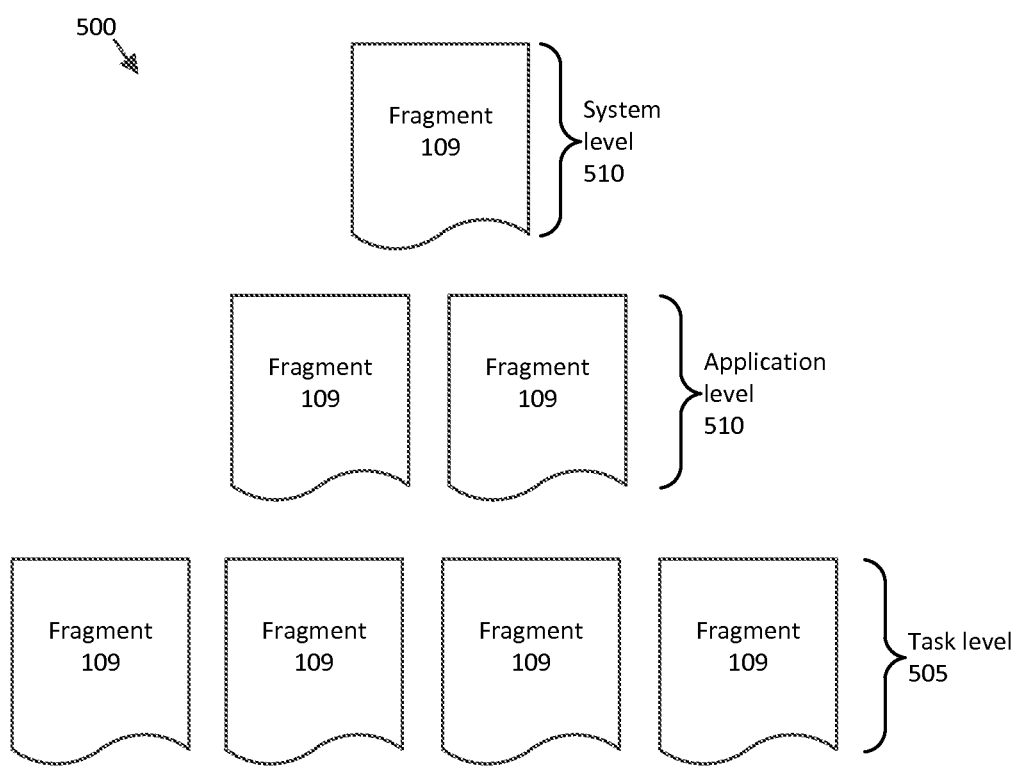
FIG. 5 is a block diagram of a fragment hierarchy.

The solver 108 is generally a set of instructions stored in a memory of the client 105, and executable by its processor. As mentioned above, the solver 108 may be called by a task 107 when the task 107 encounters an exception. As described further below, the solver 108 uses one or more fragments 109 to attempt to resolve an exception. For example, a fragment 109 may be a set of instructions stored in the memory of the client 105, and executable by a processor, for obtaining user input necessary to resolve an exception and to allow a task 107, and therefore an application 106, to continue processing. As illustrated in FIG. 5 and discussed further below, fragments 109 may be stored and/or accessed in a hierarchical manner.

Network 110 is generally a packet network, and may incorporate one or more of a cellular network, the Internet, a wide area network, a local area network, etc.

Server 115 may be a general-purpose computing device including a memory and a processor, the memory storing instructions executable by the processor, e.g., instructions for carrying out steps and processes as disclosed herein.

Data store 120 may be a relational database or the like included within server 115 or, more likely, within one or more separate computing devices in communication with server 115.

FIG. 2 is a block diagram of an exemplary task 107. The task 107 includes an exemplary set of task units 205. For example, the task 107 could be called by an application 106 for the purpose of performing a synchronization operation. Accordingly, a first task unit 205 could be configured to confirm that a user of the application 106 accepted an end user license agreement (EULA). The second task unit 205 could be configured to confirm that an end-user had accepted terms of service for a remote source of data being synchronized. A third task unit 205 could be configured to perform a single sign-on (SSO) authentication, e.g., by submitting information to server 115 to confirm that a user of the application 106 had rights to access data requested to be synchronized. Further, a fourth task unit 205 could be configured to perform the synchronization of data, e.g., to synchronize data stored in an application 106 with data stored in data store 120 associated with the server 115. Each of the successive task units 205 following the first (EULA) task unit 205 in the task 107 executes following completion of the prior task. That is, in this example, terms of service are not checked until the EULA is verified. SSO authentication is not performed until the terms of service are verified, and synchronization is not performed until SSO authentication is successfully completed.

FIG. 3 is a block diagram of the exemplary task of FIG. 2 accessing the solver 108. In this example, a EULA task unit 205 verifies that a user has accepted the EULA, but a terms of service task unit 205 encounters an exception when attempting to verify a user has accepted terms of service. Accordingly, the task unit invokes the solver 108, which resolves the exception, generally according to instructions included in a fragment 109 accessed by the solver 108; in this example, a fragment 109 provides instructions for presenting the user with an interface requesting that the user review and accept the terms of service, and then recording the user's acceptance of the terms of service, whereupon the solver 108 returns execution to the SSO task unit 205, which proceeds as described above.

FIG. 4 is a flow diagram of an exemplary process 400 for invoking and using the solver 108. The process 400 begins in a step 405, in which a task unit 205 catches an exception. For example, as stated above, a user may not have accepted an End User License Agreement or Terms of Service, Next, in a step 410, the task unit 205 determines whether the exception is a solvable exception. In general, a task unit 205 makes this determination based on whether the exception thrown is identified as a "solvable exception," e.g., includes an identifier indicating a solvable exception, or is some other exception. If the exception is not a somewhat exception, then the process 400 ends. Otherwise, a step 415 is executed next.

In step 415, the task unit 205 that threw the exception in step 410 invokes the solver 108.

Next, in a step 420, the solver 108 determines whether the invoking task unit 205 was requesting input from a foreground user interface, or whether the task unit 205 was executing as a background service. A foreground user interface is a user interface, generally a graphical user interface (GUI) that presents data and/or request input from a user. For example, a form for inputting data may be included in a foreground user interface. In contrast, a background process may periodically synchronize or fetch data, or perform a variety of other tasks, without presenting any interface, or providing a notification, to a user, at least assuming no exception is thrown. If the task unit 205 invoking the solver was executing a foreground request, then step 435 is executed next. Otherwise, the task unit 205 was executing a background request, in step 425 is executed next. When implemented on certain operating systems, step 420 may be skipped. For example, Apple Corporation's iOS does not include background services. Thus, if client 105 is using iOS, the process 400 may proceed directly from step 415 to step 435.

In any case, in step 425, the solver 108 causes a notification of the exception to be provided to a user, e.g., via a pop-up box or the like in a GUI of the client 105. Generally, the notification informs the user of the exception, and may describe steps to be taken, e.g., data be provided such as a password, username, etc., to resolve the exception. The notification also generally provides a mechanism for the user to indicate acceptance of the notification, i.e., to proceed to resolve the exception.

Following step 425, in step 430, the solver 108 determines whether user input has been received indicating acceptance of the notification. If yes, step 435 is executed next. Otherwise, the process 400 proceeds to step 465, discussed below. In some cases, a user may provide an indication to ignore a notification, e.g., by providing an input to ignore a notification, or by failing to provide input to accept the notification within a predetermined period of time.

In step 435, the solver 108 selects a fragment 109 to attempt to resolve the exception. As mentioned above and as shown in FIG. 5, fragments 109 may be stored and/or accessed in a hierarchical manner. Further, fragments 109 may be stored and/or accessed in other ways, including ???? FIG. 5 is a block diagram of a fragment hierarchy 500. In the hierarchy 500, which may be maintained in metadata associated with a set of fragments 109 stored in a storage unit such as a file system, a relation data store, etc., a task level 505 includes fragments 109 respectively associated with one or more particular task units 205. An application level 510 includes fragments 109 associated with particular applications 106. Thus, application 106 could have various requirements for receiving certain user information, e.g., a phone number, e-mail address, etc. Accordingly, an application level 510 fragment 109 could be provided for use with all task units 205 requesting such information, or in case certain task units 205 required such information but did not have their own task level 505 fragments 109 associated with them. Similarly, a system level 515 includes fragments 109 intended to be generic for all applications included in a computing system. System level 515 may sometimes be referred to as an operating system level, and system level 515 fragments could be included in an operating system.

In any case, solver 108 generally attempts to select a fragment 109 that is as appropriate as possible for resolving an exception thrown by a particular task unit 205. This, if the solver 108 can locate a fragment 109 that is specifically associated with the task unit 205 that has thrown the exception, then that fragment 109 is used. However, if no fragment 109 specifically associated with the task unit is available, then the solver 108 may look for a fragment 109 that operates at a more generic level to resolve the exception. When a fragment 109 for resolving the exception is found, the process 400 continues to a step 440.

Thus, following step 435, in step 440, the solver 108 provides a solver user interface for a user to provide input to resolve the exception. For example, the user may be requested to enter a username, password, or the like, or may be requested to accept or decline a license, etc. Further, a user may be provided with a "cancel" button or the like to dismiss the solver.

Next, in step 445, the solver 108 determines whether input has been received to dismiss the solver 108. If so, step 465 is executed next. Otherwise, step 450 is executed next.

In step 450, the solver 108 applies the fragment selected in step 435. For example, the solver may provide information, e.g., log in information, acceptance of a EULA or ToS, etc., to the task unit 205 that threw an exception.

Following step 450, in step 455, the solver 108 determines whether the exception has been resolved, e.g., whether requirements for login information, acceptance of a EULA or ToS, etc, have been met for the application 106. If so, process 400 proceeds to step 460. Otherwise, step 465 is executed next.

In step 460, solver 108 re-queues task units 205 pending in the task 107 that invoked the solver 108. Following step 460, the process 400 ends.

In step 465, which may follow either step 430 or step 455, the solver 108 dumps any task units queued for execution in the task 107 that invoked the solver 108. Following step 465, process 400 ends.

Computing devices such as those disclosed herein may employ any of a number of computer operating systems, including, but by no means limited to, versions and/or varieties of the Microsoft Windows® operating system, the iOS by Apple Computer, Inc., Android by Google, Inc., the Unix operating system (e.g., the Solaris® operating system distributed by Sun Microsystems of Menlo Park, Calif.), the AIX UNIX operating system distributed by International Business Machines (IBM) of Armonk, New York, and the Linux operating system. Computing devices in general may include any one of a number of computing devices, including, without limitation, a computer workstation, a desktop, notebook, laptop, or handheld computer, or some other computing device.

Computing devices such as disclosed herein further generally each include instructions executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases or data stores described herein may include various kinds of mechanisms for storing, accessing, and retrieving various kinds of data, including a hierarchical database, a set of files in a file system, an application database in a proprietary format, a relational database management system (RDBMS), etc. Each such database or data store is generally included within a computing device employing a computer operating system such as one of those mentioned above, and are accessed via a network in any one or more of a variety of manners. A file system may be accessible from a computer operating system, and may include files stored in various formats. An RDBMS generally employs Structured Query Language (SQL) in addition to a language for creating, storing, editing, and executing stored procedures, such as the PL/SQL language mentioned above. Database 115 may be any of a variety of known RDBMS packages, including IBMS DB2, or the RDBMS provided by Oracle Corporation of Redwood Shores, Calif. In one implementation, database 115 is SQLite, which runs on the iOS and Android operating systems.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:

executing, in a computing device having a processor and a memory, a task unit included in an application that includes instructions for executing an application task;

receiving an exception thrown by the task unit;

identifying a program fragment for resolving the exception by searching a hierarchy of program fragments using a first search for a task level fragment associated with the task unit that threw the exception and, if the task level fragment is not found, using a second search for at least one of an application level fragment associated with the application and a system level fragment associated with an operating system of the computing device; and using the identified program fragment to obtain user input to resolve the exception;

wherein the application includes a high-level operation having at least one of a user agreement, data synchronization, and access authentication, such that the identified program fragment comprises a solver program that is stored in the memory and accessible therefrom when the exception is received and automatically to be executed by the processor to attempt to resolve the exception according to the identified at least one of the task level fragment, application level fragment, and system level fragment, thereby enabling continued processing of the high-level operation automatically when the solver program resolves the exception.

2. The method of claim 1, further comprising determining that the exception is a solvable exception, the processor generating a solvable exception identifier that indicates automatically that the exception thrown is pre-determined to be solvable, and, if the exception is not a solvable exception, providing a notification that the exception cannot be solved.

3. The method of claim 1, further comprising:

determining that the exception was thrown by a background application;

requesting a user indication to resolve the exception;

and identifying the fragment only after receiving the user indication.

4. The method of claim 1, further comprising:

determining that the exception was thrown by a background application;

requesting a user indication concerning whether the exception should be resolved or ignored;

receiving a user indication to ignore the exception; and dumping all pending application tasks.

5. The method of claim 1, wherein at least one program fragment is identified by the processor for automated exception resolution by the processor automatically running the at least one program fragment to obtain user input to process the exception resolution, and thereby enable the application task to continue processing.

6. The method of claim 1, wherein searching the hierarchy of program fragments includes the first search for the task level fragment, the second search for the application level fragment, and a third search for the system level fragment.

7. The method of claim 1, further comprising:

determining that the exception has been resolved; and re-queuing pending tasks in the application.

8. A system, comprising:
a computing device that includes a processor and a memory, the memory storing instructions executable by the processor to provide operations comprising:
- executing, in a computing device having a processor and a memory, a task unit included in an application that includes instructions for executing an application task;
- receiving an exception thrown by the task unit;
- identifying a program fragment for resolving the exception by searching a hierarchy of program fragments using a first search for a task level fragment associated with the task unit that threw the exception and, if the task level fragment is not found, using a second search for at least one of an application level fragment associated with the application and a system level fragment associated with an operating system of the computing device; and
- using the identified program fragment to obtain user input to resolve the exception;
- wherein the application includes a high-level operation having at least one of a user agreement, data synchronization, and access authentication, such that the identified program fragment comprises a solver program that is stored in the memory and accessible therefrom when the exception is received and automatically to be executed by the processor to attempt to resolve the exception according to the identified at least one of the task level fragment, application level fragment, and system level fragment, thereby enabling continued processing of the high-level operation automatically when the solver program resolves the exception.

9. The system of claim 8, the operations further comprising determining that the exception is a solvable exception, wherein the processor generates a solvable exception identifier that indicates automatically that the exception thrown is pre-determined to be solvable, and, if the exception is not a solvable exception, providing a notification that the exception cannot be solved.

10. The system of claim 8, operations further comprising:
- determining whether the exception was thrown by a background application;
- requesting a user indication to resolve the exception;
- identifying the program fragment only if the user indicates to resolve the exception; and
- dumping all pending application tasks if the user indicates to ignore the exception.

11. The system of claim 8, wherein at least one program fragment is identified by the processor for automated exception resolution by the processor automatically running the at least one program fragment to obtain user input to process the exception resolution, and thereby enable the application task to continue processing.

12. The system of claim 8, wherein searching the hierarchy of program fragments includes the first search for the task level fragment, the second search for the application level fragment, and a third search for the system level fragment.

13. The system of claim 8, the operations further comprising:
- determining that the exception has been resolved; and
- re-queuing pending tasks in the application.

14. A non-transitory computer-readable storage medium tangibly embodying computer-executable instructions, the instructions when executed by a processor providing operations comprising:
- executing, in a computing device having a processor and a memory, a task unit included in an application that includes instructions for executing an application task;
- receiving an exception thrown by the task unit;
- identifying a program fragment for resolving the exception by searching a hierarchy of program fragments using a first search for a task level fragment associated with the task unit that threw the exception and, if the task level fragment is not found, using a second search for at least one of an application level fragment associated with the application and a system level fragment associated with an operating system of the computing device; and
- using the identified program fragment to obtain user input to resolve the exception;
- wherein the application includes a high-level operation having at least one of a user agreement, data synchronization, and access authentication, such that the identified program fragment comprises a solver program that is stored in the memory and accessible therefrom when the exception is received and automatically to be executed by the processor to attempt to resolve the exception according to the identified at least one of the task level fragment, application level fragment, and system level fragment, thereby enabling continued processing of the high-level operation automatically when the solver program resolves the exception.

15. The medium of claim 14, the operations further comprising determining that the exception is a solvable exception, wherein the processor generates a solvable exception identifier that indicates automatically that the exception thrown is pre-determined to be solvable, and, if the exception is not a solvable exception, providing a notification that the exception cannot be solved.

16. The medium of claim 14, the operations further comprising:
- determining that the exception was thrown by a background application;
- requesting a user indication to resolve the exception;
- and identifying the fragment only after receiving the user indication.

17. The medium of claim 14, the operations further comprising:
- determining that the exception was thrown by a background application;
- requesting a user indication concerning whether the exception should be resolved or ignored;
- receiving a user indication to ignore the exception; and
- dumping all pending application tasks.

18. The medium of claim 14, wherein at least one program fragment is identified by the processor for automated exception resolution by the processor automatically running the at least one program fragment to obtain user input to process the exception resolution, and thereby enable the application task to continue processing.

19. The medium of claim 14, wherein searching the hierarchy of program fragments includes the first search for the task level fragment, the second search for the application level fragment, and a third search for the system level fragment.

20. The medium of claim 14, the operations further comprising:
- determining that the exception has been resolved; and
- re-queuing pending tasks in the application.

* * * * *